(12) United States Patent
Nochi

(10) Patent No.: US 8,528,809 B2
(45) Date of Patent: Sep. 10, 2013

(54) PERSONAL IDENTIFICATION NUMBER INPUT APPARATUS, CONTROL METHOD FOR THE SAME, AND CARD PROCESSING SYSTEM

(75) Inventor: Masatoshi Nochi, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 588 days.

(21) Appl. No.: 12/719,955

(22) Filed: Mar. 9, 2010

(65) Prior Publication Data

US 2010/0258624 A1 Oct. 14, 2010

(30) Foreign Application Priority Data

Apr. 8, 2009 (JP) .................. 2009-094320

(51) Int. Cl.
- *G06K 5/00* (2006.01)
- *G06K 7/00* (2006.01)
- *G06F 7/08* (2006.01)

(52) U.S. Cl.
USPC ............ 235/380; 235/381; 235/435; 235/486

(58) Field of Classification Search
USPC .................. 235/380, 381, 435, 439, 482, 486
See application file for complete search history.

(56) References Cited

U.S. PATENT DOCUMENTS

| | | | | |
|---|---|---|---|---|
| 2007/0093104 A1* | 4/2007 | Mouri | ............................ | 439/188 |
| 2009/0006747 A1* | 1/2009 | Otsuka | .......................... | 711/115 |

FOREIGN PATENT DOCUMENTS

| | | |
|---|---|---|
| JP | 4-98776 | 8/1992 |
| JP | 11-030953 | 2/1999 |
| JP | 11-345285 | 12/1999 |
| JP | 11345285 A * | 12/1999 |
| JP | 2000-276563 | 10/2000 |
| JP | 2001-014500 | 1/2001 |
| JP | 2003-036466 | 2/2003 |
| JP | 2004-005109 | 1/2004 |
| JP | 2004005109 A * | 1/2004 |
| JP | 2004-318821 | 11/2004 |
| JP | 2006-146558 | 6/2006 |
| JP | 2006-215770 | 8/2006 |
| JP | 3139988 | 2/2008 |

OTHER PUBLICATIONS

Japanese Office Action for Japanese Patent Application No. 2009-094320 Mailed on Jan. 4, 2011.

* cited by examiner

*Primary Examiner* — Steven S Paik
*Assistant Examiner* — April Taylor
(74) *Attorney, Agent, or Firm* — Turocy & Watson, LLP

(57) ABSTRACT

Card data read by a card reader and a personal identification number inputted via an input unit are transmitted to an information processing apparatus. A timer is made to start measuring a predetermined waiting time in accordance with a notification of completion of processing using the card data and the personal identification number from the information processing apparatus. A warning is given if a card loaded in the card reader is detected by a detection unit when the measurement of the waiting time by the timer is finished.

7 Claims, 6 Drawing Sheets

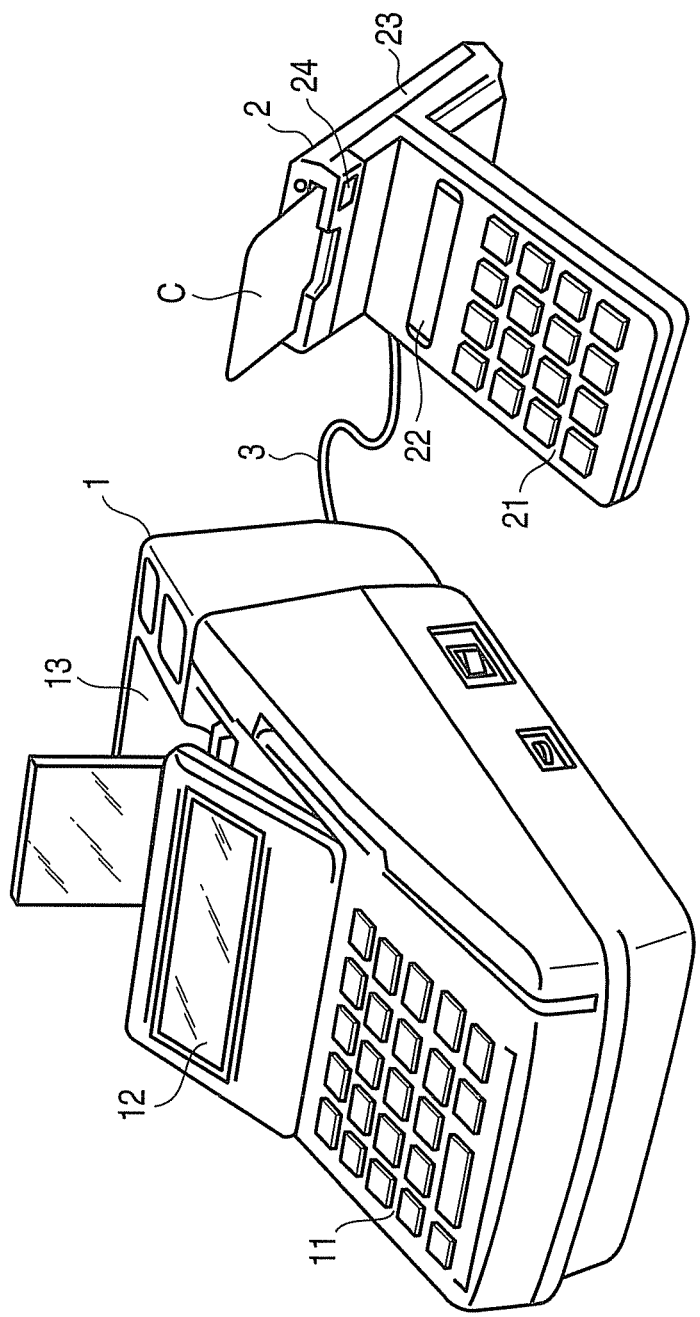
F I G. 1

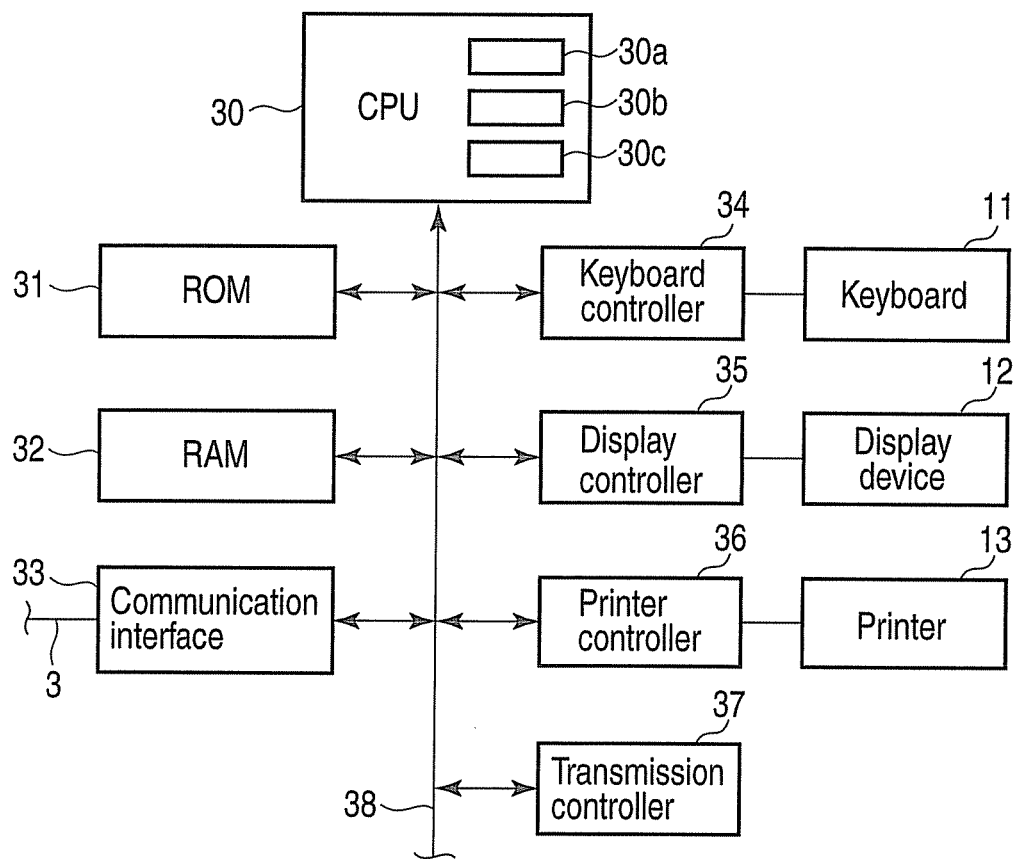
F I G. 2

PERSONAL IDENTIFICATION NUMBER INPUT APPARATUS, CONTROL METHOD FOR THE SAME, AND CARD PROCESSING SYSTEM

CROSS-REFERENCE TO RELATED APPLICATION

This application is based upon and claims the benefit of priority from the prior Japanese Patent Application No. 2009-094320, filed Apr. 8, 2009, the entire contents of which are incorporated herein by reference.

TECHNICAL FIELD

The present invention relates to a personal identification number input apparatus having a card reader which an IC card can be inserted in and removed from and an input unit for a personal identification number of the IC card, a control method for the same, and a card processing system having the personal identification number input apparatus.

BACKGROUND

Recently, with the spread of IC cards, there are many more opportunities of using IC cards. For example, in a shop, credit settlement with a credit card can be used. Credit settlement is carried out using a credit processing apparatus and a personal identification number input apparatus connected for communication with the credit processing apparatus.

The personal identification number input apparatus has a card reader and a personal identification number input unit. The personal identification number input apparatus sends card information read from a credit card loaded in the card reader and a personal identification number inputted by a shopper with the input unit, to the credit processing apparatus. The credit processing apparatus executes credit settlement on the basis of the received card information and personal identification number, and inputted article information of a purchased article.

As an apparatus having a card insertion port as in the personal identification number input apparatus, there is an apparatus having a card-leaving prevention function. For example, JP-UM-A-4-98776 discloses a data processing apparatus having a detection unit which detects a card inserted in a card insertion port and notifies that the card is left behind on the basis of the result of the detection by the detection unit.

The card-leaving prevention function of the conventional personal identification number input apparatus is realized by displaying a predetermined message on a display device or buzzing to warn the card owner that the credit card is left behind, as in the data processing apparatus disclosed in JP-UM-A-4-98776.

However, since the warning is given immediately after settlement is completed, there is a probability that a card owner who remembers to remove the card may feel uncomfortable.

SUMMARY

In view of the foregoing circumstances, it is an object of the invention to provide a personal identification number input apparatus which enables prevention of card-leaving without causing a card owner to feel uncomfortable, a control method for the same, and a card processing system having the personal identification number input apparatus.

A personal identification number input apparatus according to an aspect of the invention includes:
a card reader which reads card data from a card that is removably loaded;
a detection unit which detects the card loaded in the card reader;
an input unit which inputs a personal identification number;
a communication unit which communicates with an information processing apparatus which executes predetermined information processing using the card data read by the card reader and the personal identification number inputted by the input unit;
a timer which starts measuring a predetermined waiting time in accordance with a notification of completion of the processing using the card data and the personal identification number from the information processing apparatus via the communication unit; and
a warning unit which gives a warning if the card is detected by the detection unit when the measurement of the waiting time by the timer is finished.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a perspective view showing the appearance of a card processing system according to an embodiment of the invention.

FIG. 2 is a block diagram showing the configuration of essential parts of a credit processing apparatus provided in the card processing system.

DETAILED DESCRIPTION

Hereinafter, an embodiment of the invention will be described with reference to the drawings. In this embodiment, the invention is applied to a card processing system including a credit processing apparatus (information processing apparatus) and a PIN pad (personal identification number input apparatus) connected to the credit processing apparatus.

Figure 3:
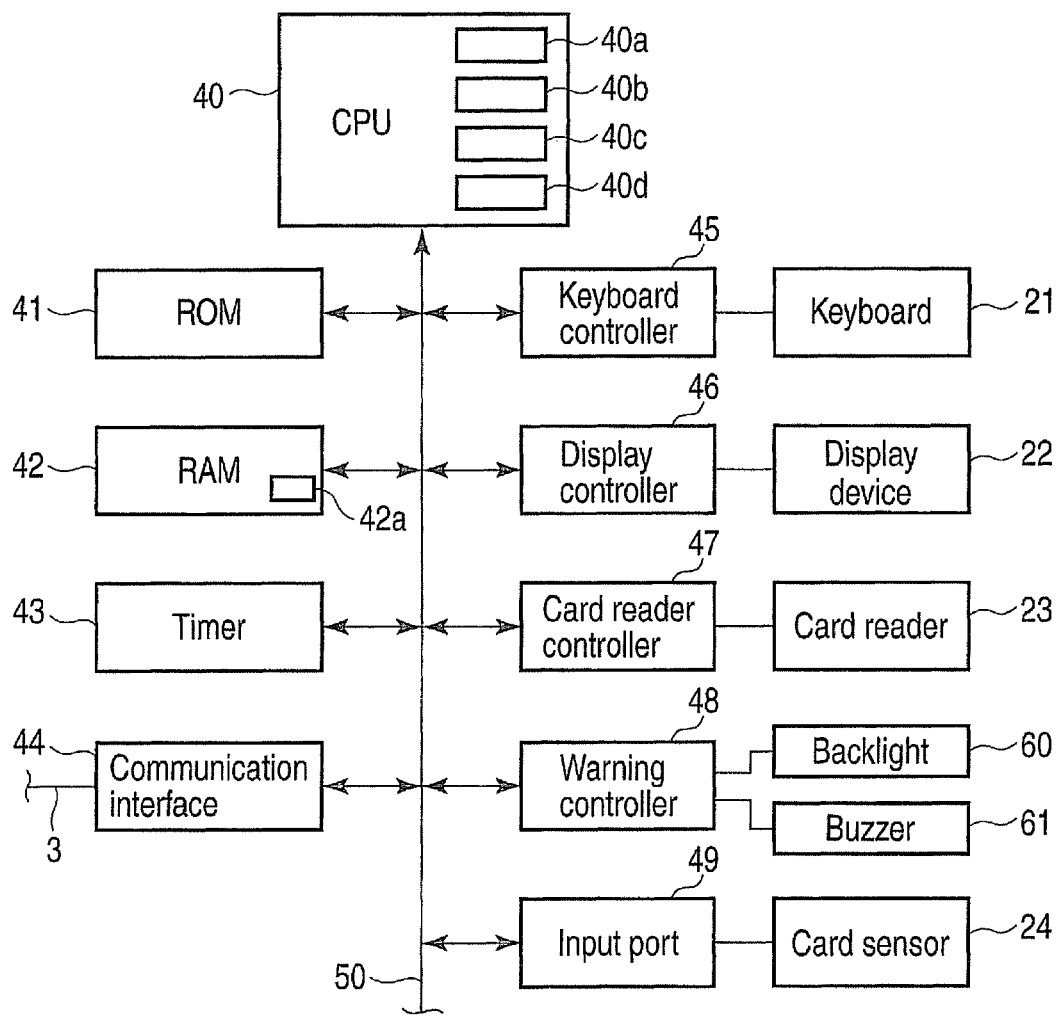
FIG. 3 is a block diagram showing the configuration of essential parts of a PIN pad provided in the card processing system.

FIG. 1 is a perspective view showing the appearance of the card processing system according to this embodiment. FIG. 2 is a block diagram showing the configuration of essential parts of a credit processing apparatus 1 provided in the card processing system. FIG. 3 is a block diagram showing the configuration of essential parts of a PIN pad 2 provided in the card processing system.

As shown in FIG. 1, the credit processing apparatus 1 and the PIN pad 2 are connected to each other via an interface cable 3.

The credit processing apparatus 1 has input and output devices including a keyboard 11, a display device 12 and a printer 13.

The credit processing apparatus 1 is equipped with a CPU (central processing unit) 30 as a control unit body which controls the overall operation of the credit processing apparatus 1 including these input and output devices and executes various kinds of processing, as shown in FIG. 2. A ROM (read only memory) 31, a RAM (random access memory) 32, a communication interface (I/F) 33, a keyboard controller 34, a display controller 35, a printer controller 36, a transmission controller 37 and the like are connected to the CPU 30 via a bus line 38 such as address bus or data bus, thus constituting the control circuit of the credit processing apparatus 1.

The keyboard 11 includes various input keys necessary for operations relating to credit settlement.

The keyboard controller 34 takes in a key signal of an input key operated on the keyboard 11 and notifies the CPU 30.

The display device 12 selectively displays data or the like inputted by operation of the keyboard 11. The display controller 35 controls the data display on the display device 12.

The printer 13 prints and issues a credit slip. The printer controller 36 controls the print operation of the printer 13.

The ROM 31 stores a control program of the CPU 30 or the like.

The RAM 32 forms various work memory areas in accordance with processing contents.

The communication interface 33 controls data communication with the PIN pad 2 via the interface cable 3.

The transmission controller 37 controls data communication with a host computer of a credit service provider connected online via the internet.

The CPU 30 executes the control program stored in the ROM 31 and thus realizes a card processing section 30a, a notification section 30b and a designation section 30c.

The card processing section 30a executes credit settlement using card data and a personal identification number transmitted from the PIN pad 2.

The notification section 30b notifies the PIN pad 2 of the completion of settlement in accordance with the completion of settlement by the card processing section 30a.

The designation section 30c designates a waiting time to be used by the PIN pad 2 for giving a warning, which will be described later.

The PIN pad 2 has input and output devices including a keyboard 21 (input unit), a display device 22 (display unit), a card reader 23 and the like. Also, a card sensor 24 (detection unit) is provided which detects whether a credit card C is loaded in the card reader 23 or not.

The PIN pad 2 is equipped with a CPU 40 as a control unit body which controls the overall operation of the PIN pad including these input and output devices, as shown in FIG. 3. A ROM 41, a RAM 42, a timer 43, a communication interface 44 (communication unit), a keyboard controller 45, a display controller 46, a card reader controller 47, a warning controller 48, an input port 49 and the like are connected to the CPU 40, thus constituting the control circuit of the PIN pad 2.

The keyboard 21 includes input keys such as ten keys for inputting numeric values. The keyboard controller 45 takes in a key signal corresponding to an input key operated on the keyboard 21 and notifies the CPU 40.

The display device 22 selectively displays data or the like inputted via the keyboard 21. The display controller 46 controls the data display on the display device 22.

The card reader 23 reads card information stored on the credit card C such as an IC card. The card reader controller 47 takes in the card information read by the card reader 23 and notifies the CPU 40.

The card sensor 24 detects the existence of the credit card C loaded in the card reader 23.

The ROM 41 stores a control program of the CPU 40 or the like.

The RAM 42 forms a work memory area such as a time setting area 42a (which will be described in detail with reference to FIG. 4 and FIG. 5) in accordance with processing situation.

The timer 43 measures a waiting time stored in the time setting area 42a in response to a command from the CPU 40.

The communication interface 44 controls data communication carried out with the credit processing apparatus 1 via the interface cable 3.

The warning controller 48 controls a backlight 60 of the display device 22 and a buzzer 61 which issues a predetermined warning sound.

The input port 49 takes in a signal outputted from the card sensor 24 and notifies the CPU 40.

The CPU 40 executes the control program stored in the ROM 41 and thus realizes a transmission section 40a, a warning section 40b, a second warning section 40c and a setting section 40d.

The transmission section 40a transmits the card data read by the card reader 23 and the personal identification number inputted via the keyboard 21, to the credit processing apparatus 1.

The warning section 40b gives a warning that the card is left behind if the credit card C is detected by the card sensor 24 when the measurement of the waiting time stored in the time setting area 42a by the timer 43 is finished.

The second warning section 40c gives a warning that the card should not be left behind, using the display device 22, before the timer 43 finishes measuring the waiting time after starting to measure the waiting time stored in the time setting area 42a.

The setting section 40d sets a waiting time that should be measured by the timer 43. Particularly in this embodiment, the waiting time designated by the designation section 30c provided in the CPU 30 of the credit processing apparatus 1 is stored in the time setting area 42a as a waiting time to be measured by the timer 43.

The credit processing apparatus 1 and the PIN pad 2 configured as described above are installed, for example, at a cashier counter of a shop. When the cashier of the shop receives a request from a shopper that the shopper wants to pay the price of a purchased article using a credit card C, the cashier operates the keyboard 11 of the credit processing apparatus 1 to register data of the purchased article. At the same time, the cashier hands the PIN pad 2 over to the shopper and has the shopper input the card information and personal identification number of the credit card C by himself or herself. That is, as the shopper receives the PIN pad 2 from the cashier, the shopper first loads the shopper's own credit card C in the card reader 23 and has the card reader 23 read the card information. Next, the shopper operates the keyboard 21 to input the personal identification number of the credit card C.

Figure 4:
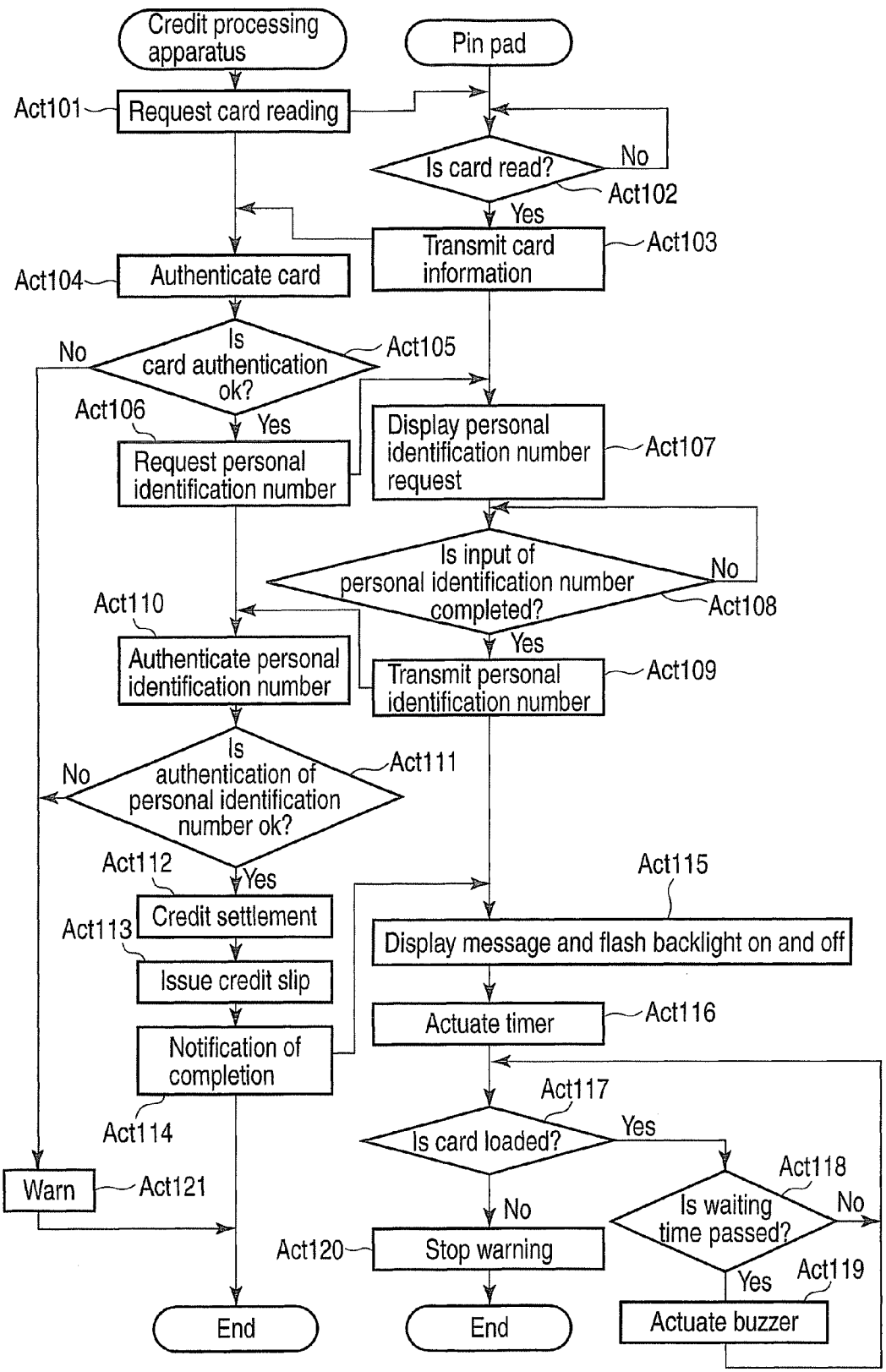
FIG. 4 is a flowchart showing card settlement executed in the card processing system.

Meanwhile, after registering the data of the purchased article to the credit processing apparatus 1, the cashier presses a credit declaration key provided on the keyboard 11 and thus declares execution of credit processing. The CPU 30 of the credit processing apparatus 1 and the CPU 40 of the PIN pad 2 are programmed to execute the processing shown in the flowchart of FIG. 4 when this declaration is made. The processing shown in the flowchart of FIG. 4 is partly executed by the card processing section 30*a*, the notification section 30*b*, the transmission section 40*a*, the warning section 40*b* and the second warning section 40*c*.

Hereinafter, the operation of the credit processing apparatus 1 and the PIN pad 2 in this embodiment will be described with reference to the flowchart of FIG. 4.

First, the CPU 30 of the credit processing apparatus 1 transmits a card reading request to the PIN pad 2 via the communication interface 33 (ACT 101).

In response to the reception of this card reading request, the PIN pad 2 shifts to a state of accepting the reading of the credit card C. During this time, the CPU 40 stands by for the reading of the credit card C by the card reader 23 (ACT 102). When the shopper inserts the credit card C in an insertion port of the card reader 23, the card sensor 24 detects the loading of the credit card C. In response to this detection, the card reader 23 reads card information from the credit card C and temporarily stores the card information in the RAM 42. At this time, the CPU 40 determines that the credit card C is read (Yes in ACT 102) and transmits the card information stored in the RAM 42 to the credit processing apparatus 1 via the communication interface 44 (ACT 103).

In response to the reception of this card information, the CPU 30 of the credit processing apparatus 1 authenticates whether the credit card C can be used for settlement or not (ACT 104, ACT 105). This authentication is carried out by determining whether or not information about card type included in the card information coincides with information about card type on the side of a card service provider which has a settlement contract concluded with the shop, stored in the ROM 31. When it is determined as a result of the authentication that the credit card C can be used (Yes in ACT 105), the CPU 30 transmits a personal identification number request to the PIN pad 2 via the communication interface 33 (ACT 106).

In response to the reception of this personal identification number request, the CPU 40 of the PIN pad 2 causes the display device 22 to display a message prompting input of a personal identification number, via the display controller 46 (ACT 107). At this time, the PIN pad 2 shifts to a state of accepting the input of a personal identification number from the keyboard 21. In the state where the message is displayed, the CPU 40 stands by for the completion of the input of the personal identification number (ACT 108). As the shopper operates ten keys arranged on the keyboard 21 in order to input the personal identification number, the numeric value corresponding to the operated ten keys is temporarily stored in the RAM 42 in a manner that enables specification of the order in which the keys are operated. When an enter key arranged on the keyboard 21 is operated, the CPU 40 determines that the input of the personal identification number is completed (Yes in ACT 108) and transmits the personal identification number that is specified from the numeric value stored in the RAM 42 to the credit processing apparatus 1 via the communication interface 44 (ACT 109).

In response to the reception of this personal identification number, the CPU 30 of the credit processing apparatus 1 authenticates whether the personal identification number is legitimate or not (ACT 110, ACT 111). Specifically, the CPU 30 transmits the card information and the personal identification number to the server of the card service provider of the credit card C via the transmission controller 37 and requests authentication from the server.

Consequently, if a response that the personal identification number is legitimate is given from the server (Yes in ACT 111), the CPU 30 transmits settlement data including article data about the shopper's purchased article, settlement amount and the like to the server of the card service provider via the transmission controller 37 and request settlement from the server (ACT 112). Then, as a condition for receiving a notification of the completion of the settlement from the server, the CPU 30 controls the printer 13 via the printer controller 36 and issues a credit slip on which information about the settlement is printed (ACT 113). After that, the CPU 30 transmits a settlement completion notification indicating that the credit settlement is completed to the PIN pad 2 via the communication interface 33 (ACT 114).

In response to the reception of this settlement completion notification, the CPU 40 of the PIN pad 2 causes the display device 22 to display a message prompting removal of the credit card C, via the display controller 46, and causes the backlight 60 to flash on and off via the warning controller 48 (ACT 115).

The CPU 40 also actuates the timer 43 in response to the display of the message and the start of the flashing of the backlight 60, and starts measuring the waiting time stored in the waiting time setting area 42*a* formed in the RAM 42 (ACT 116).

After the timer 43 is actuated, the CPU 40 determines whether the credit card C is loaded in the card reader 23 or not, on the basis of the output of the card sensor 24 inputted via the input port 49 (ACT 117). If it is determined that the credit card C is loaded in the card reader 23 (Yes in ACT 117), the CPU 40 determines whether the measurement of the waiting time by the timer 43 is completed or not (ACT 118). If it is determined that the measurement of the waiting time is not completed (No in ACT 118), the CPU 40 determines again whether the credit card C is loaded in the card reader 23 or not (ACT 117). That is, the PIN pad 2 is in the standby state until the credit card C is removed from the card reader 23 or the measurement of the waiting time by the timer 43 is completed.

If the measurement of the waiting time by the timer 43 is completed in this state (Yes in ACT 118), the CPU 40 causes the buzzer 61 to buzz via the warning controller 48 (ACT 119). That is, if the credit card C is detected by the card sensor 24 when the timer 43 finishes measuring the waiting time, a warning is given indicating that the card is loaded in the card reader 23.

Meanwhile, if the credit card C is removed from the card reader 23 (No in ACT 117), the CPU 40 causes the warning controller 48 to stop warning (ACT 120). At this time, if the buzzer 61 is yet to buzz, the warning controller 48 stops the flashing of the backlight 60 and the message display on the display device 22. If the buzzing of the buzzer 61 is already started, the warning controller 48 stops the flashing of the backlight 60, the message display on the display device 22 and the buzzing of the buzzer 61. After the warning is thus stopped, the CPU 40 ends this processing.

If the credit processing apparatus 1 fails in the card authentication (No in ACT 105) or if the credit processing apparatus 1 fails in the authentication of the personal identification number (No in ACT 111), the CPU 30 of the credit processing apparatus 1 gives a warning indicating that the credit card C cannot be used or that the personal identification number is wrong by displaying a predetermined error message or the like on the display device 12 (ACT 121) and then ends the processing.

In this manner, after receiving the notification of the completion of the settlement, the PIN pad 2 prompts the shopper to remove the credit card C by flashing the backlight 60 on and off and displaying the message on the display device 22 until the waiting time stored in the time setting area 42a passes. Then, if the credit card C is not removed even after the lapse of the waiting time, the PIN pad 2 gives a warning by the buzzer 61.

The waiting time to be measured by the timer 43 can be changed to a time desired by the operator who uses the card processing system. Hereinafter, the setting of the waiting time to be measured by the timer 43 will be described.

Figure 5:
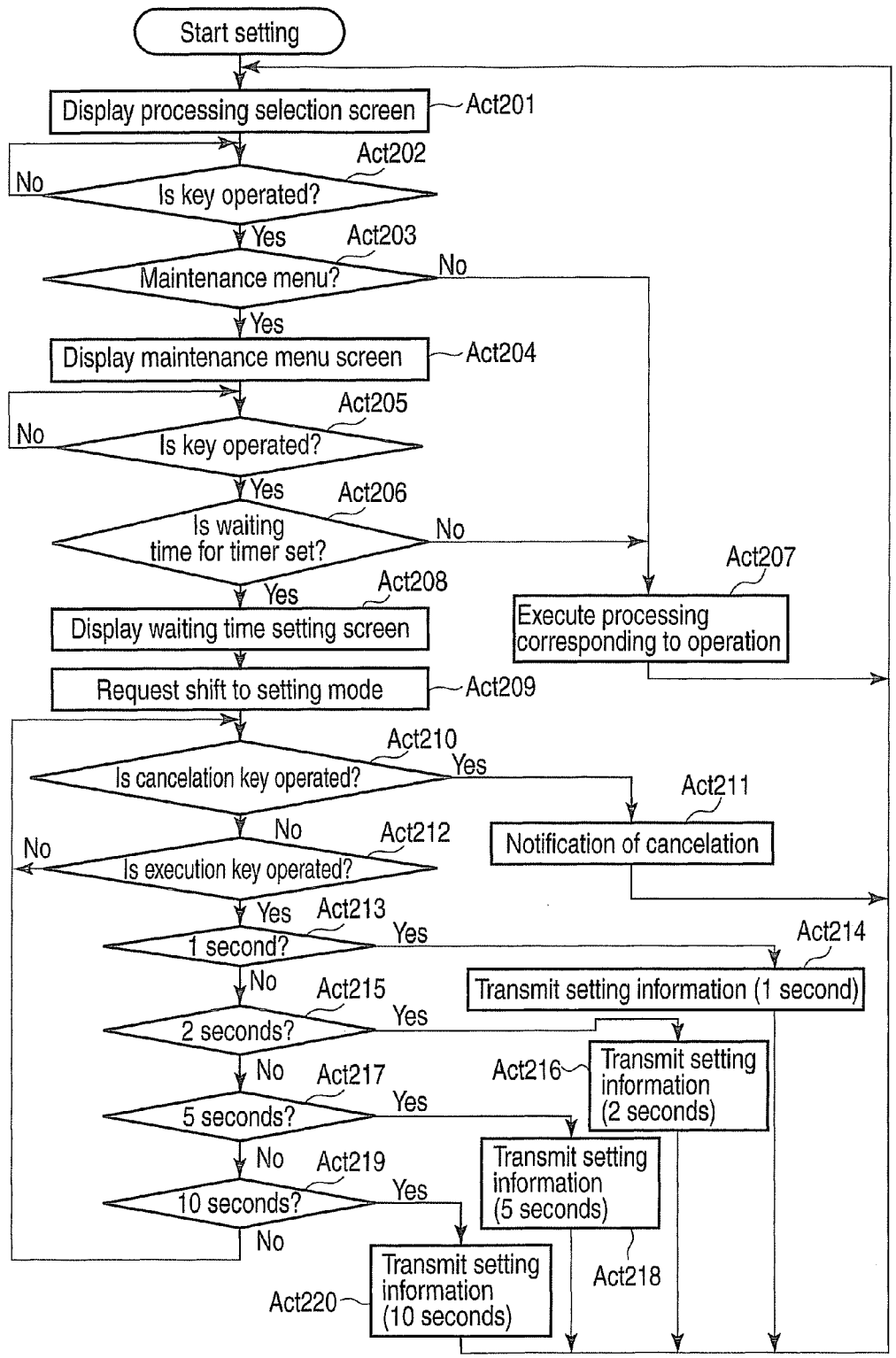
FIG. 5 is a flowchart showing setting executed by the credit processing apparatus provided in the card processing system.

When a predetermined key provided on the keyboard 11 of the credit processing apparatus 1 is operated, the setting with respect to various functions of the credit processing apparatus 1 and the PIN pad 2 is started. Thus, the CPU 30 of the credit processing apparatus 1 is programmed to execute the processing shown in the flowchart of FIG. 5. The processing shown in the flowchart of FIG. 5 is partly executed by the designation section 30c.

Hereinafter, the operation of the credit processing apparatus 1 in the setting will be described with reference to the flowchart of FIG. 5.

After the setting is started, the CPU 30 first causes the display device 12 to display a processing selection screen for selecting a function to be set, via the display controller 35 (ACT 201). In the state where this processing selection screen is displayed, the CPU 30 accepts key input on the keyboard 11 (ACT 202). If one of the input keys arranged on the keyboard 11 is operated (Yes in ACT 202), the CPU 30 determines whether a maintenance menu is selected by the key input or not (ACT 203).

If the maintenance menu is selected (Yes in ACT 203), the CPU 30 causes the display device 12 to display a maintenance menu selection screen to be executed, via the display controller 35 (ACT 204) and accepts key input on the keyboard 11 again (ACT 205).

If one of the input keys arranged on the keyboard 11 is operated (Yes in ACT 205), the CPU 30 determines whether setting of a waiting time for the timer 43 is selected by the key input or not (ACT 206). If setting of a waiting time is not selected (No in ACT 206), the CPU 30 execute processing with respect to the setting selected in accordance with the key input on the keyboard 11 (ACT 207).

Meanwhile, if setting of a waiting time for the timer 43 is selected (Yes in ACT 206), the CPU 30 causes the display device 12 to display a waiting time setting screen via the display controller 35 (ACT 208). The CPU 30 also transmits a request to shift to a waiting time setting mode to the PIN pad 2 via the communication interface 33 (ACT 209).

In the waiting time setting screen, a selection area for selecting one of 1 second, 2 seconds, 5 seconds, and 10 seconds as the waiting time for the timer 43 is displayed. In the state where this screen is displayed, the CPU 30 determines whether a cancellation key arranged on the keyboard 11 is operated or not (ACT 210). If the cancellation key is operated (Yes in ACT 210), the CPU 30 transmits a notification to cancel the setting of the waiting time for the timer 43 to the PIN pad 2 via the communication interface 33 (ACT 211).

Meanwhile, if the cancellation key is not operated (No in ACT 210), the CPU 30 determines whether an execution key arranged on the keyboard 11 is operated or not (ACT 212). If it is determined that the execution key is operated (Yes in ACT 212), the CPU 30 determines whether the waiting time that is currently selected on the waiting time setting screen is 1 second or not (ACT 213). If the selected waiting time is 1 second (Yes in ACT 213), the CPU 30 transmits setting information designating the waiting time of 1 second to the PIN pad 2 via the communication interface 33 (ACT 214).

Meanwhile, if the selected waiting time is not 1 second when the execution key is operated (No in ACT 213), the CPU 30 determines whether the selected waiting time is 2 seconds or not (ACT 215). If the selected waiting time is 2 seconds (Yes in ACT 215), the CPU 30 transmits setting information designating the waiting time of 2 seconds to the PIN pad 2 via the communication interface 33 (ACT 216).

Meanwhile, if the selected waiting time is not 2 seconds when the execution key is operated (No in ACT 215), the CPU 30 determines whether the selected waiting time is 5 seconds or not (ACT 217). If the selected waiting time is 5 seconds (Yes in ACT 217), the CPU 30 transmits setting information designating the waiting time of 5 seconds to the PIN pad 2 via the communication interface 33 (ACT 218).

Meanwhile, if the selected waiting time is not 5 seconds when the execution key is operated (No in ACT 217), the CPU 30 determines whether the selected waiting time is 10 seconds or not (ACT 219). If the selected waiting time is 10 seconds (Yes in ACT 219), the CPU 30 transmits setting information designating the waiting time of 10 seconds to the PIN pad 2 via the communication interface 33 (ACT 220).

If the selected waiting time is not 10 seconds when the execution key is operated (No in ACT 219), it means that none of these waiting times is selected. Therefore, the CPU 30 prompts the operator to select a waiting time by displaying a message on the display device 12 or the like, and then accepts the selection of a waiting time again and waits for the operation of the cancellation key and the execution key (ACT 210, ACT 212).

After the notification of cancellation or the setting information is transmitted to the PIN pad 2, the CPU 30 displays the processing selection screen again and waits for the next operation (ACT 201, ACT 202).

Figure 6:
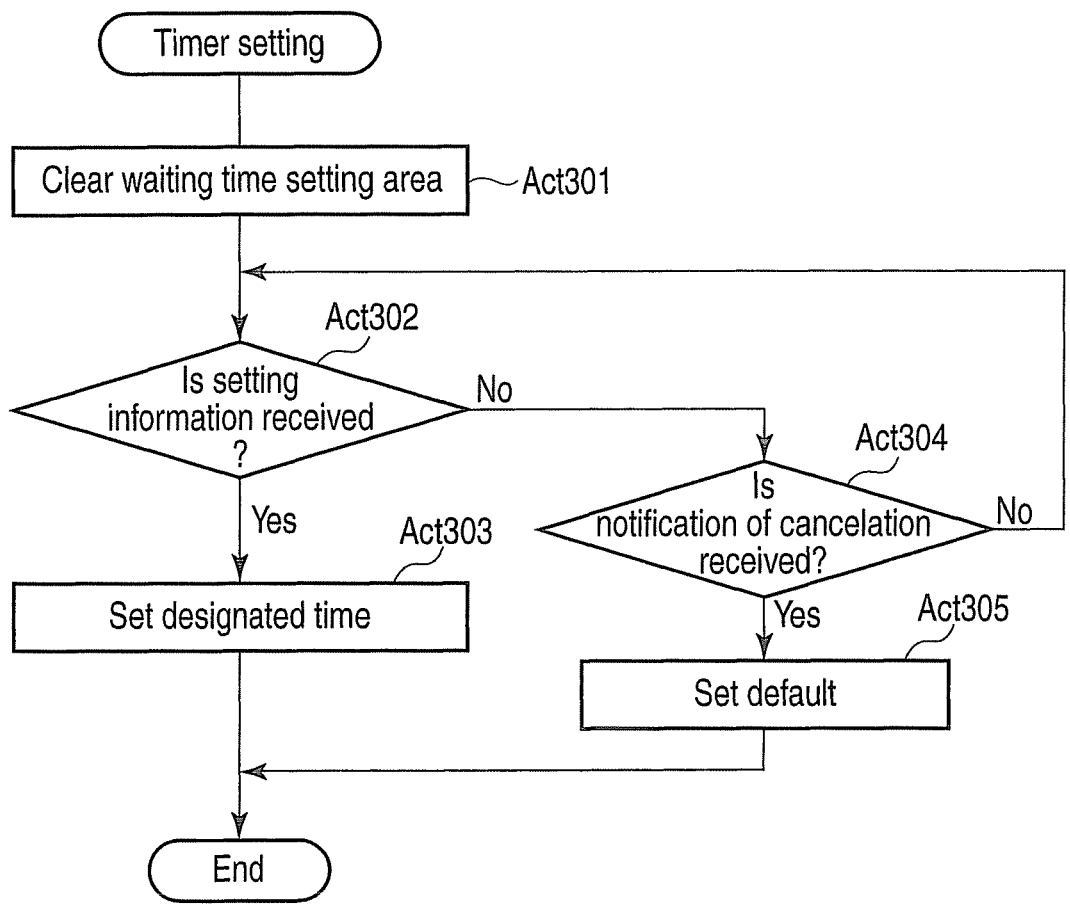
FIG. 6 is a flowchart showing setting executed by the PIN pad provided in the card processing system.

The CPU 40 of the PIN pad 2, receiving a shifting request to shift to the waiting time setting mode for the timer 43 transmitted from the credit processing apparatus 1 in the above-described setting, is programmed to execute the processing shown in the flowchart of FIG. 6. The processing shown in the flowchart of FIG. 6 is partly executed by the setting section 40d.

Hereinafter, the operation of the PIN pad 2 when the shifting request is received will be described with reference to the flowchart of FIG. 6.

First, the CPU 40 of the PIN pad 2 clears the data in the waiting time setting area 42a formed in the RAM 42 (ACT 301). After that, the CPU 40 determines whether the setting information is received from the credit processing apparatus 1 or not (ACT 302).

If the setting information transmitted from the credit processing apparatus 1 (ACT 214, ACT 216, ACT 218 or ACT 220) is received via the communication interface 44 (Yes in ACT 302), the CPU 40 stores the waiting time designated by the received setting information, in the waiting time setting area 42a (ACT 303).

Meanwhile, if the setting information is not received from the credit processing apparatus 1 (No in ACT 302), the CPU 40 determines whether the notification of cancellation is received from the credit processing apparatus 1 or not (ACT 304). If the notification of cancellation transmitted from the credit processing apparatus 1 (ACT 211) is received (Yes in ACT 304), the CPU 40 stores a default value (for example, 5 seconds) of the waiting time for the timer 43 stored in the ROM 41, in the waiting time setting area 42a (ACT 305).

In this manner, in the setting executed on the PIN pad 2, reception of the setting information or the notification of cancellation from the credit processing apparatus 1 is waited for. After either the setting information or the notification of cancellation is received and the waiting time is set in the waiting time setting area 42a, the processing ends. Thus, in the credit processing after the waiting time for the timer 43 desired by the operator is set in the waiting time setting area 42a, this waiting time is used.

As described above, the PIN pad 2 as the personal identification number input apparatus according to this embodiment does not give any warning by the buzzer 61 for prevention of card-leaving until the waiting time passes after the settlement by the credit card C is completed. Therefore, a situation where a shopper who is aware of the need to remove the credit card C feel uncomfortable about the warning sound outputted by the buzzer 61 can be avoided.

After the settlement by the credit card C is completed, the PIN pad 2 gives a warning for prevention of card-leaving by displaying a message on the display device 22 and flashing the backlight 60 on and off before the buzzer 61 starts buzzing. Therefore, the shopper can be reminded of the need to remove the credit card C without output of a warning sound of the buzzer 61.

The waiting time for the timer 43 can be changed to a time desired by the user through the setting described with reference to FIG. 5 and FIG. 6. Thus, setting of a preferable waiting time corresponding to the state of use of the card processing system can be realized. Moreover, the setting of a waiting time is carried out by operating the credit processing apparatus 1. Normally, the credit processing apparatus 1 is installed facing the position where a salesclerk stands. Therefore, a situation where a shopper arbitrarily changes the waiting time can be avoided.

In the embodiment, the case of applying the personal identification number input apparatus according to the invention to the PIN pad connected to the card settlement apparatus is described. However, it is a matter of course that the invention may be applied to a personal identification number processing apparatus connected to another information processing apparatus.

In the embodiment, the backlight 60 is flashed on and off immediately after the completion of settlement, thus giving a warning. However, for the warning immediately after the completion of settlement, other techniques such as changing the lighting color of the backlight 60 may be employed.

In the embodiment, in the setting of the waiting time for the timer 43, one of 1 second, 2 seconds, 5 seconds, and 10 seconds is selected on the setting screen displayed on the display device 12, thus designating the waiting time to be set. However, the technique of designating a waiting time is not limited to this embodiment. Additionally, a waiting time can be made selectable every second on the setting screen displayed on the display device 12 and the selected waiting time can be designated as the waiting time to be set. Also, it is also possible to operate numeric keys arranged on the keyboard 11 to input numeric values directly and thus designate a waiting time.

The setting of a waiting time may be carried out by key operation on the keyboard 21 of the PIN pad 2, instead of operation of the credit processing apparatus 1. In such case, for example, an operation key to declare setting of a waiting time is provided on the keyboard 21 of the PIN pad 2. The setting of a waiting time is started in response to the operation of this key, and designation of a waiting time through the operation of numeric keys on the keyboard 21 is accepted. Then, the time setting area 42a is updated with the designated waiting time. By employing such a setting technique, it is also possible to set a waiting time desired by the operator as in the embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A personal identification number input apparatus comprising:
 a display unit which displays information;
 a card reader which reads card data from a card that is removably loaded;
 a detection unit which detects the card loaded in the card reader;
 an input unit which inputs a personal identification number;
 a communication unit which communicates with an information processing apparatus which executes predetermined information processing using the card data read by the card reader and the personal identification number inputted by the input unit;
 a timer which starts measuring a waiting time in accordance with a notification of completion of the information processing using the card data and the personal identification number from the information processing apparatus via the communication unit;
 a setting unit which sets the waiting time to be measured by the timer, wherein the waiting time is received from the information processing apparatus via the communication unit;
 a first warning unit which outputs a warning sound in response to the card being detected by the detection unit upon completion of measurement of the waiting time by the timer; and
 a second warning unit which outputs a warning using the display unit after the timer starts measuring the waiting time and before the timer finishes measuring the waiting time.

2. The apparatus of claim 1, wherein the first warning unit stops the warning sound in response to the detection unit no longer detecting the card loaded in the card reader.

3. The apparatus of claim 1, wherein:
 in response to the setting unit receiving setting information designating the waiting time from the information processing apparatus after receiving a request to shift to a waiting time setting mode from the information processing apparatus, the setting unit stores the waiting time designated by the setting information in a memory for storing the waiting time to be measured by the timer, and
 in response to the setting unit receiving a notification to cancel from the information processing apparatus after receiving the request to shift to the waiting time setting mode, the setting unit stores a default value of the waiting time in the memory.

4. A card processing system comprising a personal identification number input apparatus and an information processing apparatus connected to each other for communication,
 the personal identification number input apparatus comprising:
 a display unit which displays information;
 a card reader which reads card data from a card that is removably loaded;
 a detection unit which detects the card loaded in the card reader;
 an input which inputs a personal identification number;

a transmission unit which transmits the card data read by the card reader and the personal identification number inputted by the input unit to the information processing apparatus;

a timer which starts measuring a waiting time in response to receipt of a notification of completion sent from the information processing apparatus; wherein the information processing apparatus further comprises a designation unit which designates a designated waiting time to be measured by the timer, and the personal identification number input apparatus further comprises a setting unit which sets the designated waiting time as the waiting time to be measured by the timer;

a first warning unit which, in response to the timer finishing measurement of the waiting time, gives a warning sound if the card is detected by the detection unit; and a second warning unit which outputs a warning using the display unit after the timer starts measuring the waiting time and before the timer finishes measuring the waiting time, the information processing apparatus comprising:

a card processing unit which executes predetermined processing using the card data and the personal identification number transmitted from the personal identification number input apparatus; and a notification unit which notifies the personal identification number input apparatus of completion of processing in accordance with completion of processing by the card processing unit.

5. The system of claim 4, wherein:

in response to the setting unit receiving setting information designating the waiting time from the information processing apparatus after receiving a request to shift to a waiting time setting mode from the information processing apparatus, the setting unit stores the waiting time designated by the setting information in a memory for storing the waiting time to be measured by the timer, and in response to the setting unit receiving a notification to cancel from the information processing apparatus after receiving the request to shift to the waiting time setting mode, the setting unit stores a default value of the waiting time in the memory, wherein the designation unit transmits the request to shift to the personal identification number input apparatus and, in response to user acceptance of the waiting time, the designation unit transmits the setting information designating the waiting time to the personal identification number input apparatus, and in response to designation of a cancellation of setup of the waiting time, the notification to cancel is transmitted to the personal identification number input apparatus.

6. A control method for a personal identification number input apparatus including a display unit that displays information, a card reader which reads card data from a card that is removably loaded, an input unit which inputs a personal identification number, and a detection unit which detects the card loaded in the card reader, the method comprising:

reading card data from the card loaded in the card reader;

accepting input of a personal identification number via the input unit;

transmitting the card data read by the card reader and the personal identification number inputted by the input unit to an information processing apparatus which executes processing with respect to the card;

starting measuring a predetermined waiting time by a timer in accordance with a notification of completion of processing using the card data and the personal identification number from the information processing apparatus, wherein the waiting time is set by a setting unit that receives the waiting time from the information processing apparatus;

outputting a warning using the display unit in response to the card being detected by the detection unit at a predetermined time after the starting the measuring and before the timer finishes measuring the waiting time; and outputting a warning sound if the card is detected by the detection unit when the measurement of the waiting time by the timer is finished.

7. The method of claim 6, further comprising:

in response to the setting unit receiving setting information designating the waiting time from the information processing apparatus after receiving a request to shift to a waiting time setting mode from the information processing apparatus, storing the waiting time designated by the setting information in a memory for storing the waiting time, and in response to the setting unit receiving a notification to cancel from the information processing apparatus after receiving the request to shift to the waiting time setting mode, storing a default value of the waiting time in the memory.

* * * * *